(12) United States Patent
Milanovich

(10) Patent No.: US 7,841,291 B1
(45) Date of Patent: Nov. 30, 2010

(54) ULTRASONIC AND/OR INFRASONIC ANIMAL REPELLENT HORN POWERED BY COMPRESSED AIR CANISTER COMBINED WITH A STROBE LIGHT

(76) Inventor: Philip John Milanovich, 3720 E. Kachina Dr., Phoenix, AZ (US) 85044-2515

( * ) Notice: Subject to any disclaimer, the term of this patent is extended or adjusted under 35 U.S.C. 154(b) by 0 days.

(21) Appl. No.: 12/605,379

(22) Filed: Oct. 26, 2009

Related U.S. Application Data

(63) Continuation-in-part of application No. 12/348,915, filed on Jan. 6, 2009, now abandoned.

(51) Int. Cl.
*A01M 29/04* (2006.01)
(52) U.S. Cl. .............. 116/137 A; 116/142 FP; 116/137 R; 340/384.1
(58) Field of Classification Search ............. 116/137 A, 116/22 A, 137 R, 139, DIG. 44, 142 FP; 119/719; 340/384.1, 384.2; 405/186
See application file for complete search history.

(56) References Cited

U.S. PATENT DOCUMENTS

| | | | |
|---|---|---|---|
| 2,922,999 A | 1/1960 | Carlin | |
| 3,277,861 A | 10/1966 | Moe | |
| 3,412,394 A | 11/1968 | Lewis et al. | |
| 3,670,690 A | 6/1972 | Swanson | |
| 3,757,731 A | 9/1973 | Pappas et al. | |
| 3,831,548 A | 8/1974 | Droege | |
| 3,872,472 A | 3/1975 | Moschgat | |
| 4,178,578 A | 12/1979 | Hall | |
| 4,227,482 A | 10/1980 | Scheindel | |
| 4,284,845 A | 8/1981 | Belcher | |
| 4,658,386 A | 4/1987 | Morris | |
| 4,669,424 A | 6/1987 | Bianco et al. | |

(Continued)

FOREIGN PATENT DOCUMENTS

DE 199 55 102 8/2000

OTHER PUBLICATIONS

Derwent Abstract, 2002-063157, Abstract of DE 20015278 U1, published May 10, 2001, title "Small Animal Scanning System for Small Spaces Inaccessible for Human Beings Has Sensor Monitoring Region to be Protected which Transmits Signal to Electronic Unit if Animal Enters".

*Primary Examiner*—R. A. Smith
*Assistant Examiner*—Tania C Courson
(74) *Attorney, Agent, or Firm*—Swift Law Office; Stephen Christopher Swift

(57) ABSTRACT

A horn powered by a compressed air canister and/or battery pack, that emits sounds that are too high for humans to hear (ultrasonic) and/or too low for humans to hear (infrasonic), to act as a means for repelling animals that can hear these sounds (e.g., mammals, birds, reptiles, or insects), combined with a strobe light powered by the battery pack, that can temporarily blind animals. The canister may contain air or other gases. Ultrasonic and infrasonic sounds may alternate. There can be different sound patterns adapted to different species of animals. It may be hand-held and operated by push button or other means. It can also enable lost persons to send signals to rescuers. It may have a strap for carrying, that can be placed around a user's neck. Alternatively, it may have a clip that can be used to attach the device to a belt, back pack, bicycle, etc.

18 Claims, 6 Drawing Sheets

U.S. PATENT DOCUMENTS

| | | | |
|---|---|---|---|
| 4,736,907 A | 4/1988 | Steffen | |
| 4,843,336 A * | 6/1989 | Kuo | 340/521 |
| 4,890,580 A | 1/1990 | Owen et al. | |
| 4,915,054 A * | 4/1990 | Vidovic et al. | 116/142 FP |
| 4,967,684 A * | 11/1990 | Vidovic et al. | 116/142 FP |
| 4,999,818 A | 3/1991 | Malleolo | |
| 5,022,790 A | 6/1991 | Stevenson | |
| 5,214,411 A | 5/1993 | Herbruck | |
| 5,355,830 A | 10/1994 | deJong | |
| 5,602,523 A | 2/1997 | Turchioe et al. | |
| 5,949,338 A * | 9/1999 | Masi et al. | 340/573.1 |
| 5,969,593 A | 10/1999 | Will | |
| 6,016,100 A | 1/2000 | Boyd et al. | |
| 6,134,184 A | 10/2000 | Waletzky et al. | |
| 6,158,385 A | 12/2000 | Boyd | |
| 6,250,255 B1 | 6/2001 | Lenhardt et al. | |
| 6,301,194 B1 | 10/2001 | Cauchy | |
| 6,392,549 B1 | 5/2002 | Wu | |
| 6,570,494 B1 | 5/2003 | Leftridge, Sr. | |
| 6,690,265 B2 | 2/2004 | Hagstrum | |
| 6,710,705 B1 | 3/2004 | Smith et al. | |
| 6,796,265 B1 | 9/2004 | Dexter et al. | |
| 7,012,506 B2 | 3/2006 | Rich et al. | |
| 7,042,340 B2 * | 5/2006 | Ewert et al. | 340/384.1 |
| 7,227,452 B1 | 6/2007 | Frost | |
| 7,274,650 B2 | 9/2007 | Jan | |
| 7,370,600 B2 | 5/2008 | Tomassetti et al. | |
| 7,506,989 B2 * | 3/2009 | Tomassetti et al. | 362/86 |
| 2005/0040935 A1 * | 2/2005 | Ewert et al. | 340/384.2 |
| 2007/0037691 A1 | 2/2007 | Stapleton | |
| 2008/0314334 A1 | 12/2008 | Dalton | |

* cited by examiner

ULTRASONIC AND/OR INFRASONIC ANIMAL REPELLENT HORN POWERED BY COMPRESSED AIR CANISTER COMBINED WITH A STROBE LIGHT

CROSS REFERENCE TO RELATED APPLICATION

This application is a Continuation-In-Part of patent application Ser. No. 12/348,915, filed Jan. 6, 2009, which is incorporated herein by reference.

BACKGROUND OF THE INVENTION

1. Field of the Invention

The present invention relates to animal repellent horns and lights.

2. Description of the Prior Art

While there are prior inventions that use sound waves that are too high and/or too low in frequency for humans to hear to repel animals, none are equivalent to the present invention.

U.S. Pat. No. 2,922,999, issued on Jan. 26, 1960, to Benson Carlin, discloses the use of directed ultrasonic radiation for the dispersion of noxious fauna, but does not use canisters of compressed gas as in the instant invention.

U.S. Pat. No. 3,277,861, issued on Oct. 11, 1966, to Lowell A. Moe, discloses a method and apparatus for repelling rodent and other undesirable animals using ultrasonic sound waves, but does not use canisters of compressed gas as in the instant invention.

U.S. Pat. No. 3,412,394, issued on Nov. 19, 1968, to Robert M. Lewis and Julius C. Strasbourger, discloses a photocell controlled pest, bird and animal chaser, using gas explosions not required by the instant invention.

U.S. Pat. No. 3,670,690, issued on Jun. 20, 1972, to Robert E. Swanson, discloses an aerosol operated horn, but does not disclose the use of the horn to produce ultrasonic and/or infrasonic waves, as in the instant invention.

U.S. Pat. No. 3,757,731, issued on Sep. 11, 1973, to Michael Pappas, Paul A. Witte and Thomas Johnson, discloses gas power operated hand held acoustic devices, but does not disclose their use to produce ultrasonic and/or infrasonic waves, as in the instant invention.

U.S. Pat. No. 3,831,548, issued on Aug. 27, 1974, to Arthur J. Droege, discloses a pest control device that produces ultrasonic vibrations to drive away pests. Unlike the instant invention, it uses an air compressor, rather than a canister of compressed air.

U.S. Pat. No. 3,872,472, issued on Mar. 18, 1975, to Robert G. Moschgat, discloses an ultrasonic system for repelling noxious fauna, but does not disclose the use of canisters containing compressed gas, as in the instant invention.

U.S. Pat. No. 4,178,578, issued on Dec. 11, 1979, to Lester B. Hall, discloses a pest control apparatus using ultrasound, but without storage of compressed air or gas, as in the instant invention.

U.S. Pat. No. 4,227,482, issued on Oct. 14, 1980, to Christian T. Scheindel, discloses a pressurized fluid-actuated sound-producing device, but does not disclose its use to produce ultrasonic and/or infrasonic waves, as in the instant invention.

U.S. Pat. No. 4,284,845, issued on Aug. 18, 1981, to Claude A. Belcher, discloses a device for freeing an area of birds, insects, or other pests, which simultaneously emits two separate audio frequencies that are shifted periodically. It does not disclose the use of compressed gas canisters, as in the instant invention.

U.S. Pat. No. 4,658,386, issued on Apr. 14, 1987, to Kenneth L. Morris, discloses an ultrasonic sound wave generator on a refuse container for repelling animals.

U.S. Pat. No. 4,669,424, issued on Jun. 2, 1987, to Frank J. Bianco and Oscar Jimenez, discloses an ultrasound generator that may be worn on an animal's collar for repelling pests such as fleas and ticks.

U.S. Pat. No. 4,736,907, issued on Apr. 12, 1988, to Rudiger Steffen, discloses preventing the collision of birds with aircraft by means of at least one light source installed on an aircraft which produces light flashes. The use of ultrasonic and/or infrasonic sound waves, as in the instant invention, is not disclosed.

U.S. Pat. No. 4,890,580, issued on Jan. 2, 1990, to Charles W. Owen and Roberto A. Garcia, discloses an electronic flea-repelling device, including an integrated circuit, but not including a compressed gas canister as in the instant invention.

U.S. Pat. No. 4,999,818, issued on Mar. 12, 1991, to Patrick F. Malleolo, discloses another ultrasonic repeller of pests and vermin.

U.S. Pat. No. 5,022,790, issued on Jun. 11, 1991, to Robert A. Stevenson, discloses an audible signaling system for divers, with a horn powered by compressed air (as from a scuba tank) but does not disclose the use of the horn to produce ultrasonic and/or infrasonic sound waves as in the instant invention.

U.S. Pat. No. 5,214,411, issued on May 25, 1993, to Steven L. Herbruck, discloses an ultrasonic animal repelling apparatus to keep animals such as dogs and cats out of locations such as yards.

U.S. Pat. No. 5,355,830, issued on Oct. 18, 1994, to Michael deJong, discloses a rechargeable air horn, but does not disclose the use of the horn to produce ultrasonic and/or infrasonic sound waves as in the instant invention.

U.S. Pat. No. 5,602,523, issued on Feb. 11, 1997, to James Turchioe and Thomas Turchioe, discloses a deer repellent system, which has a piezo-electric driver utilizing a horn type device that produces harmonic distortion, but does not disclose the use of the device to produce ultrasonic and/or infrasonic sound waves as in the instant invention.

U.S. Pat. No. 5,969,593, issued on Oct. 19, 1999, to George A. Will, discloses a system for moving vehicles using ultrasound to induce animals to move out of the paths of the vehicles.

U.S. Pat. No. 6,016,100, issued on Jan. 18, 2000, to Randal D. Boyd and Walter J. Frankewich, Jr., discloses devices that can be driven into the ground, sense the presence of animals, and produce ultrasound to keep the animals out of an area.

U.S. Pat. No. 6,134,184, issued on Oct. 17, 2000, to Lucy Waletzky and Peter J. Wilk, discloses an apparatus for chasing animals from an automobile, by means that include ultrasonic and infrasonic sound waves, but does not disclose producing the sound waves using a compressed air canister, as in the instant invention.

U.S. Pat. No. 6,158,385, issued on Dec. 12, 2000, to Randal D. Boyd, discloses a bird feeder that uses electric shocks and/or ultrasonic sound to keep away squirrels.

U.S. Pat. No. 6,250,255, issued on Jun. 26, 2001, to Martin L. Lenhardt and Alfred L. Ochs, discloses methods and apparatus for alerting and/or repelling birds and other animals, including the use of ultrasonic sound waves, but does not disclose producing the waves using canisters as in the instant invention.

U.S. Pat. No. 6,301,194, issued on Oct. 9, 2001, to Charles J. Cauchy, discloses a self-powered insect and rodent repellent device using ultrasound.

U.S. Pat. No. 6,392,549, issued on May 21, 2002, to Chih Hsien Wu, discloses a portable mosquito repelling/killing device, which, unlike the instant invention, does not disclose the use ultrasonic or infrasonic sound waves produced using compressed gas canisters.

U.S. Pat. No. 6,570,494, issued on May 27, 2003, to Kenneth Charles Leftridge, Sr., discloses an ultrasonic sound generating mosquito guard powered by a solar panel.

U.S. Pat. No. 6,690,265, issued on Feb. 10, 2004, to Jonathan Tryon Hagstrum, discloses an infrasound hazard-warning method and device for alerting night-migrating birds to obstacles, producing sounds that birds can hear that are too low for humans to hear.

U.S. Pat. No. 6,710,705, issued on Mar. 23, 2004, to Blaine M. Smith and Timothy M. Simon, discloses a device that drives pests away using ultrasonic sound and flashes of light.

U.S. Pat. No. 6,796,265, issued on Sep. 28, 2004, to James T. Dexter and David A. Hancock, discloses a pneumatic signaling devices for divers, but does not disclose the use of ultrasonic and/or infrasonic sound waves as in the instant invention.

U.S. Pat. No. 7,012,506, issued on Mar. 14, 2006, to Christopher T. Rich and Erika L. Kneller, discloses a pest repeller having a pair of ultrasound speakers rotatably mounted on a post.

U.S. Pat. No. 7,227,452, issued on Jun. 5, 2007, to James W. Frost, discloses an ultrasound generating device powered by solar cells to keep birds away.

U.S. Pat. No. 7,274,650, issued on Sep. 25, 2007, to Te-Chin Jan, discloses a device that randomly produces sounds of different frequencies, including ultrasonic, to repel rodents.

U.S. Pat. No. 7,370,600, issued on May 13, 2008, to Louis Tomassetti and Peter Tomassetti, discloses an air horn powered by a compressed air canister, with a light signal, but does not disclose the use of the horn to produce ultrasonic and/or infrasonic sound waves, nor the use of a strobe light, as in the instant invention.

U.S. Patent Application Publication No. 2007/0037691, published on Feb. 15, 2007, to Howard Stapleton, discloses a sound-emitting device, which produces high frequency sound waves that most young people can hear, but most old people cannot. It does not disclose the use of a compressed gas canister to produce the sound waves, as in the instant invention.

U.S. Patent Application Publication No. 2008/0314334, published on Dec. 25, 2008, to James Dalton, discloses a device and method for controlling animal behavior, and deterring animals from entering a predetermined area, by methods that include noise that is ultrasonic and/or infrasonic, but does not disclose the use of a compressed gas canister to produce the noise.

German Patent No. 199 55 102, issued on Aug. 3, 2000, inventor Günter Waldmann, discloses a device for scaring off animals and insects using sounds and ultrasonics.

Derwent Abstract, 2002-063157, Abstract of DE 20015278 U1, published 10 May 2001, has the title "Small Animal Scanning System for Small Spaces Inaccessible for Human Beings Has Sensor Monitoring Region to be Protected which Transmits Signal to Electronic Unit if Animal Enters".

None of the patents cited above disclose ultrasonic or infrasonic sound generators powered by compressed air canisters in combination with strobe lights. None of the above inventions and patents, taken either singly or in combination, is seen to describe the instant invention as claimed.

SUMMARY OF THE INVENTION

The present invention is a sound-producing device, resembling fog horns currently on the market that are powered by compressed air canisters, that emits sounds that are too high for humans to hear (ultrasonic) and/or too low for humans to hear (infrasonic), to act as a means for repelling animals that can hear these sounds, and is combined with a strobe light of sufficient intensity to temporarily blind animals. The canister may contain air or other gases. A battery pack supplies electric current that powers the strobe light, and may power the horn without the use of gas from the canister. Ultrasonic and infrasonic sounds may alternate. There can be different sound patterns adapted to different species of animals. It may produce sounds resembling gunshots, blasts or explosions. The compressed air may also be impregnated with offensive odors (e.g., skunk or ammonia) that also help in deterring animal attacks. It may be hand-held (or not hand-held) and operated by push button, remote control, or other means. It could also enable lost persons to send signals to rescuers.

Accordingly, it is a principal object of the invention to provide a means for repelling animals using ultrasound.

It is a second object of the invention to provide a means for repelling animals using infrasound.

It is a third object of the invention to provide a means for repelling animals using a combination of ultrasound and infrasound.

It is a fourth object of this invention to provide a means for repelling animals with a combination of a strobe light and ultrasound and/or infrasound.

It is a fifth object of this invention to provide a means for repelling animals using pungent and/or caustic odors.

It is a sixth object of the invention is to enable lost persons to send signals to rescuers.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a horn (resembling a portable foghorn) that fits over a cannister of compressed air (or other gas) and can emit ultrasonic and/or infrasonic sound waves, in combination with a strobe light of sufficient intensity to temporarily blind an animal (e.g., for five minutes). It can be used to repel or deter animal attacks, such as by bears, lions, snakes, etc. Ultrasonic sound waves, while too high in frequency to be heard by humans, can be heard by some animals, and if loud enough, may cause extreme discomfort and pain in those animals. Infrasonic sound waves, while too low in frequency to be heard by humans, can also be heard by some animals, and if loud enough, may also cause extreme discomfort and pain in those animals. The invention may also be used to produce fog or signal horn type sounds that are audible to humans, but can also be used to repel or deter animals.

Figure 1:
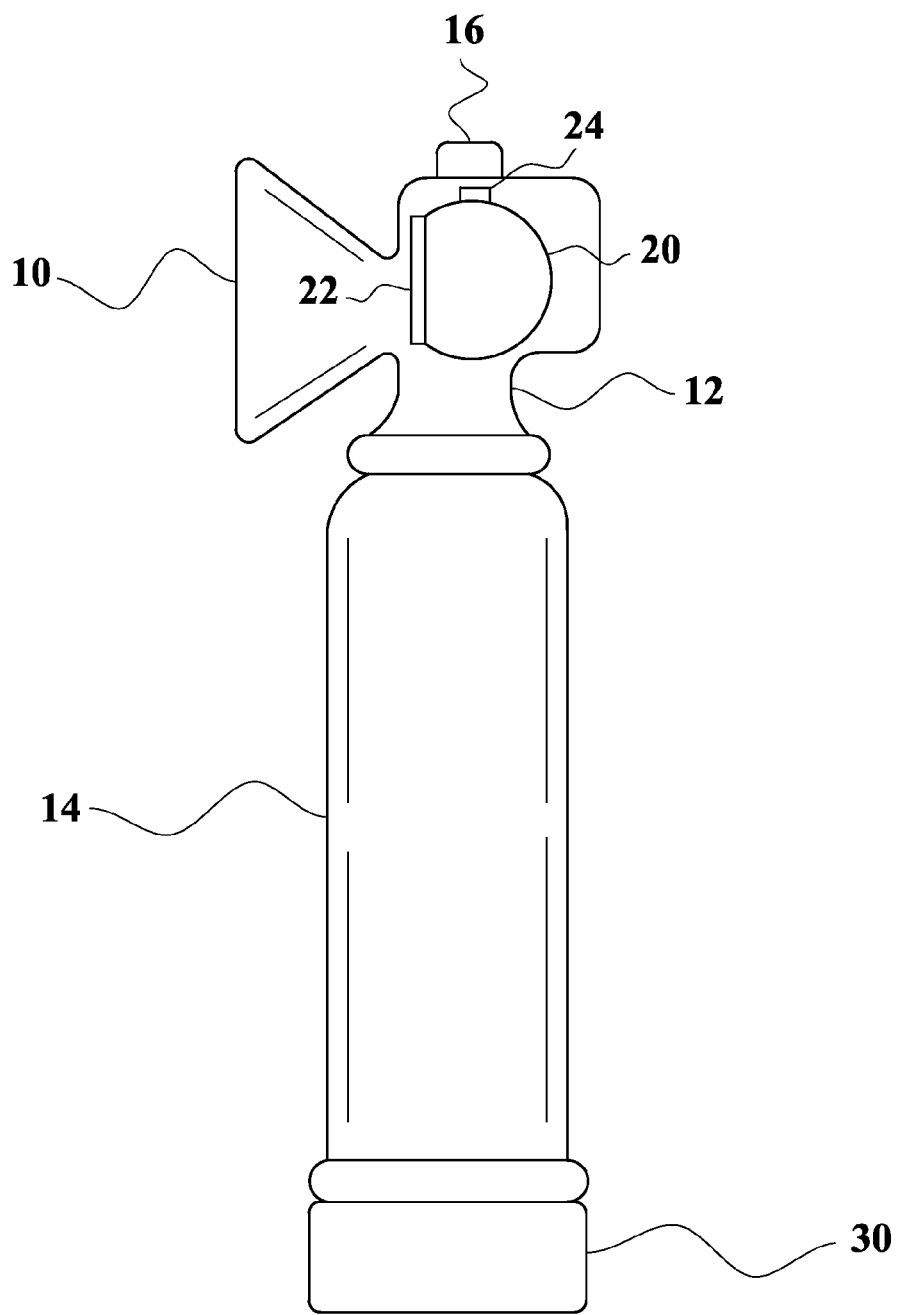
FIG. 1 is a left side elevational view of the first preferred embodiment of the invention, with the eye protector shield in a lowered position.

FIG. 1 is a left side elevational view of the first preferred embodiment of the invention, showing the horn 10, having a base 12 that fits over a canister 14 of compressed air (or other gas), the push button actuator 16 for the horn, the housing 20 for the strobe light, the flip-up eye protector shield 22 in a lowered position, and the push button actuator 24 for the strobe light. A battery pack 30 supplies electric current that powers the strobe light, and may also power the horn, causing it to emit audible, ultrasonic or infrasonic sound waves, without the use of gas from the canister. For example, the electric current may activate a vibrating member in the horn, producing sound in a manner similar to a smoke detector. The electric sound production may be activated automatically when the canister is depleted of gas, or it may be selected by pushing or turning an actuator.

Figure 2:
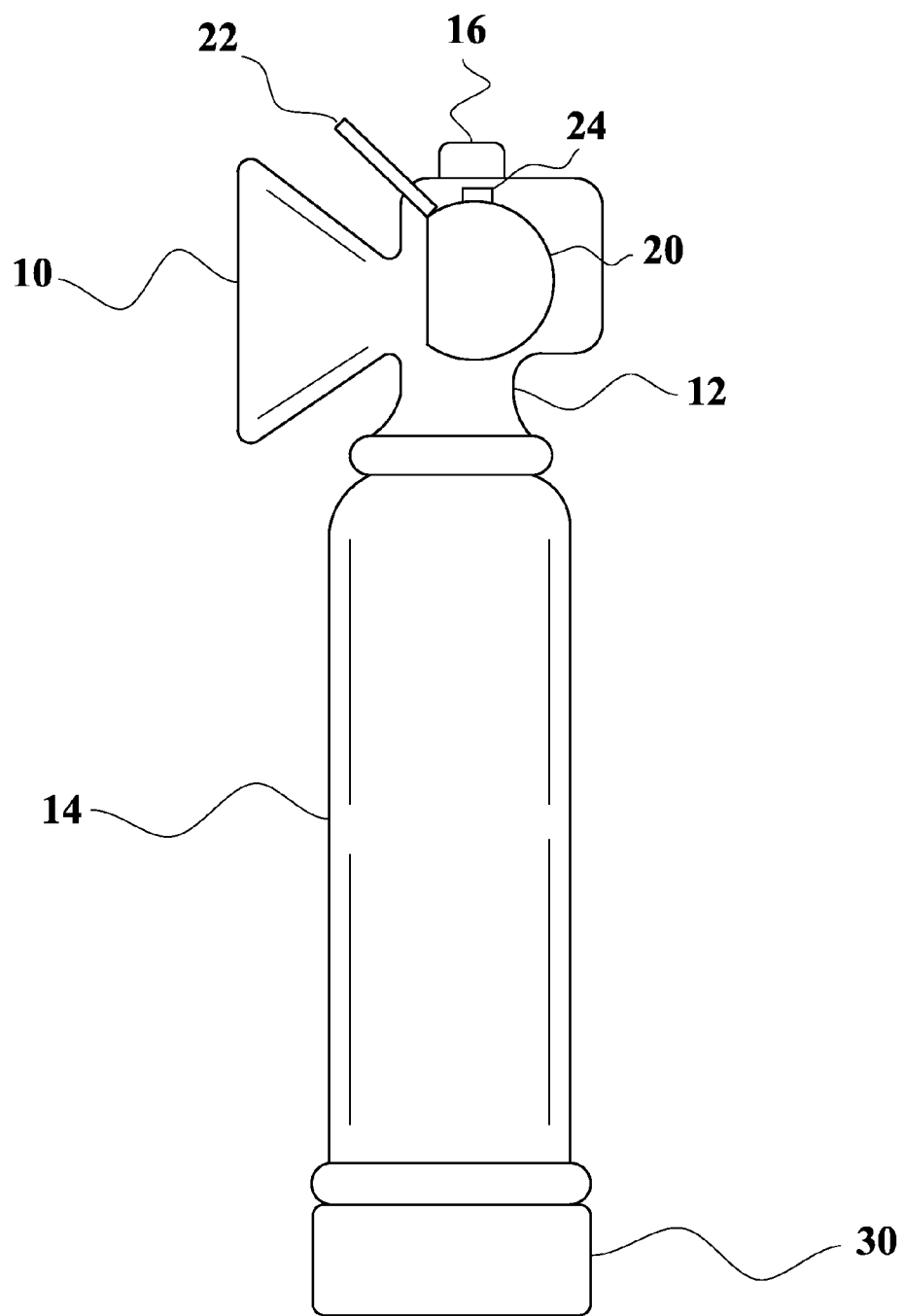
FIG. 2 is a left side elevational view of the first preferred embodiment of the invention, with the eye protector shield in a raised position.

FIG. 2 is a left side elevational view of the first preferred embodiment of the invention, showing the flip-up eye-protector shield in a raised position. The eye-protector shield must be raised to use the strobe light. It prevents the user from being himself blinded by the strobe light.

Figure 3:
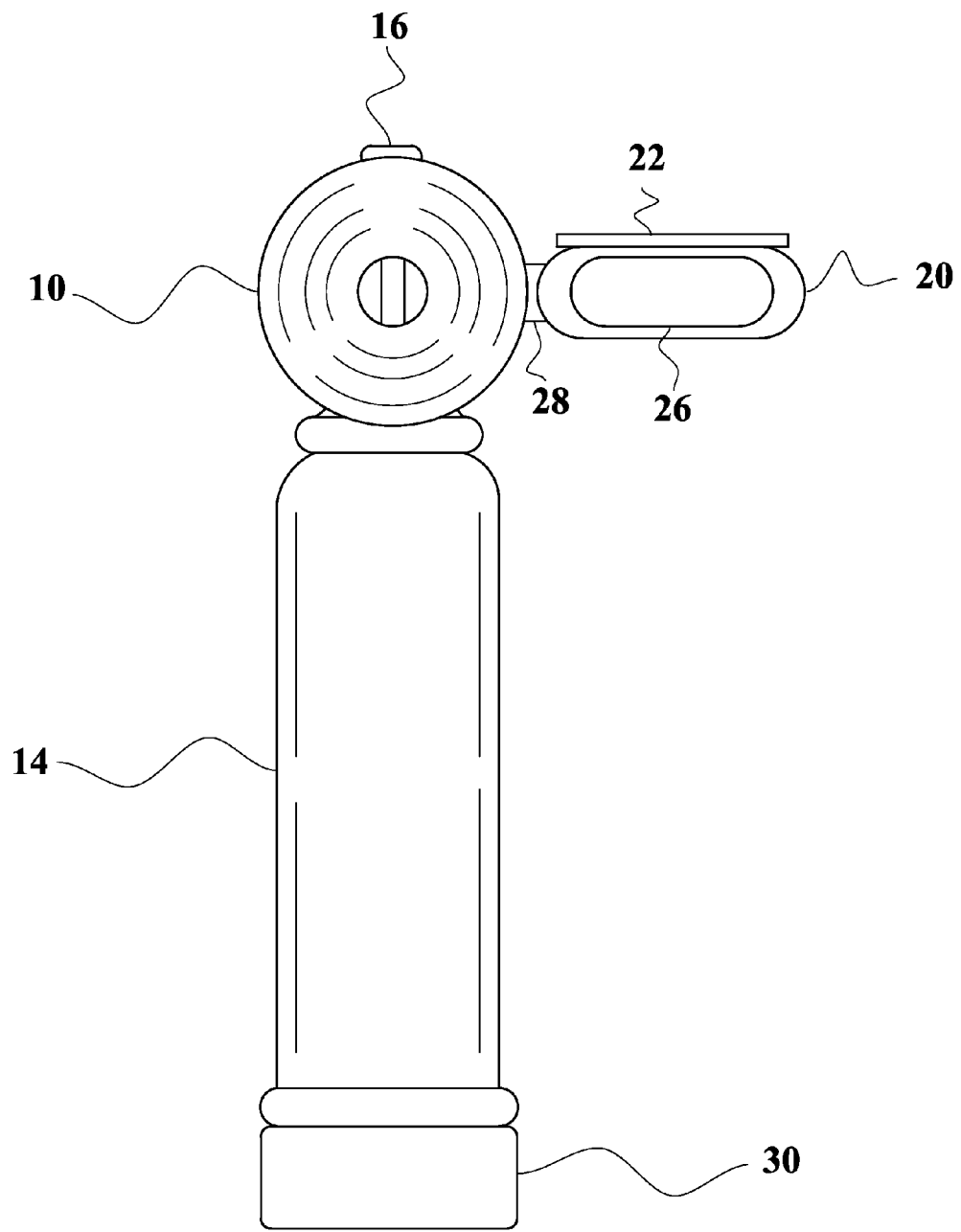
FIG. 3 is a front elevational view of the first preferred embodiment of the invention, with the eye protector shield in a raised position.
Figure 4:
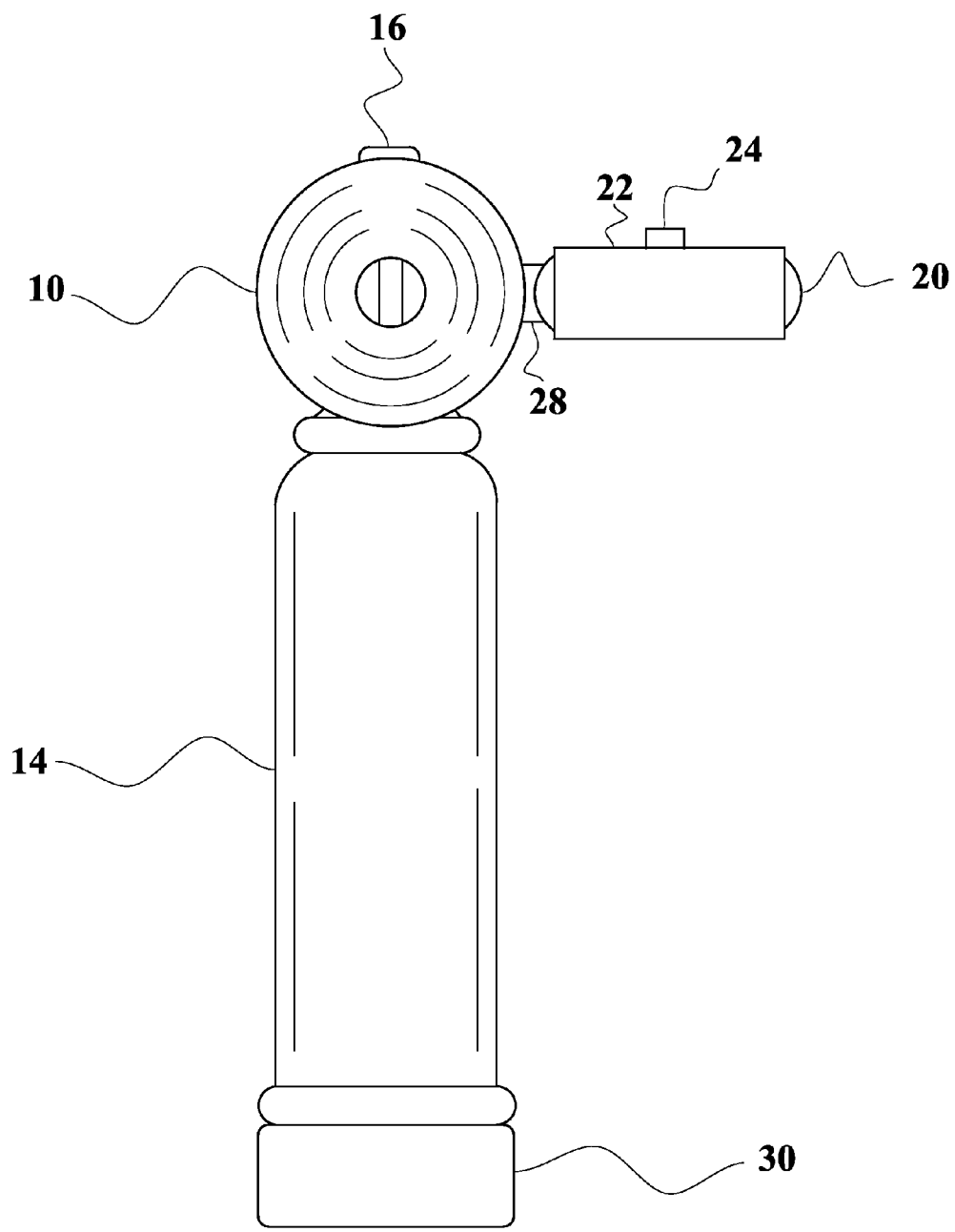
FIG. 4 is a front elevational view of the first preferred embodiment of the invention, with the eye protector shield in a lowered position.

FIG. 3 is a front elevational view of the first preferred embodiment of the invention, showing the strobe light 26 and its housing 20, supporting arm 28, and the eye-protector shield 22 in a raised position. FIG. 4 is a front elevational view of the first preferred embodiment of the invention, with the eye protector shield 22 in a lowered position. In the first preferred embodiment, the horn will emit a single frequency of ultrasonic (or infrasonic) sound waves. The base is suitably dimensioned and configured to fit over the canister, and enables the air (or other gas) to flow from the canister through the horn to cause the horn to emit the sound waves. The bottom of the base may snap into a rim on the top of the canister. When the canister is exhausted, it may be snapped out and replaced by another canister. (Alternatively, the bottom of the base may screwed or latched onto the canister.) The push button 16 (or other manually operated actuator) for the horn when depressed enables gas to flow through the horn, and when released prevents the flow of gas through the horn. It may do this by depressing a valve-actuator (or other suitable means) on the canister.

Figure 5:
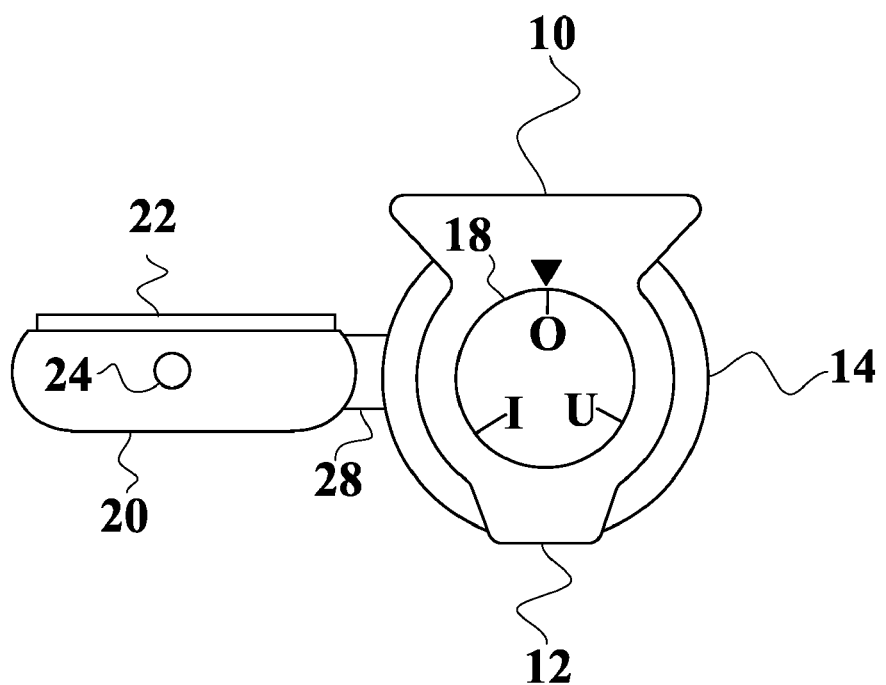
FIG. 5 is a top plan view of the second preferred embodiment of the invention, with the eye protector shield in a lowered position.
Figure 6:
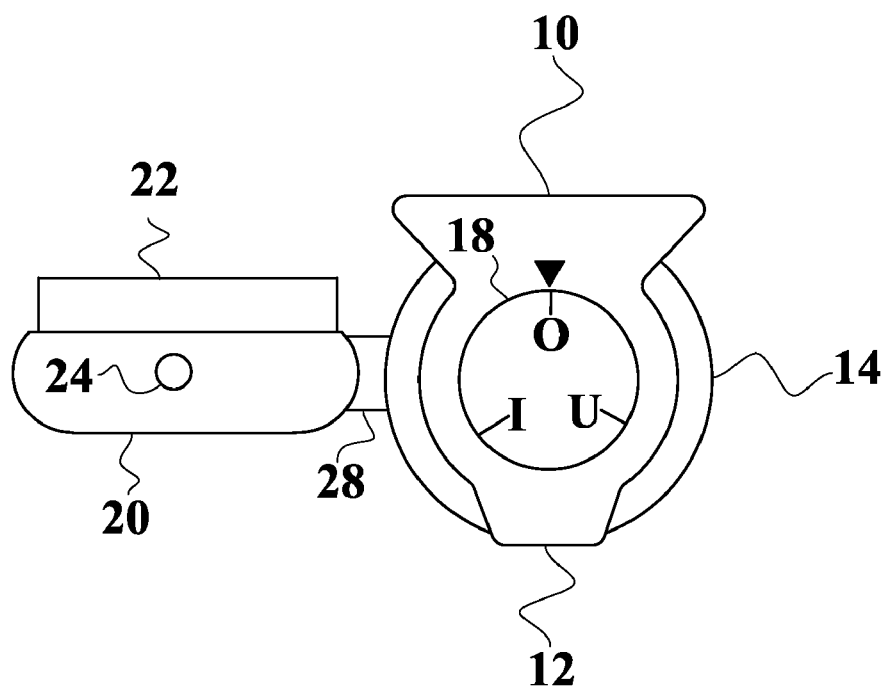
FIG. 6 is a top plan view of the second preferred embodiment of the invention, with the eye protector shield in a raised position.

FIG. 5 is a top plan view of the second preferred embodiment of the invention, with the eye protector shield 22 in a lowered position, which is the same as the first preferred embodiment, except that a rotatable manually operated actuator 18 is substituted for the push button actuator for the horn. FIG. 6 is a top plan view of the second preferred embodiment of the invention, with the eye protector shield 22 in a raised position. The rotatable manually operated actuator has on off setting O at which the flow of air through the horn is blocked, an ultrasonic setting U at which the horn emits ultrasonic sound waves, and an infrasonic setting I at which the horn emits infrasonic sound waves. Alternatively, the rotatable manually operated actuator may have a plurality of ultrasonic settings at different frequencies, and/or a plurality of infrasonic settings at different frequencies, and/or one or more sonic settings (within the range of normal human hearing). Switching between different frequencies may aid in deterring and/or repelling animal attacks. Optionally, the rotatable manually operated actuator may have settings at which a combination of sound waves at two or more frequencies are emitted simultaneously. Sounds of different frequencies may be produced by vibrating plates or reeds of different sizes. Rotating the actuator may cause the appropriates plates or reeds to move into position in an air passage so that they will produce the frequencies selected. (Alternatively, the air or power source may be moved to the appropriate plates or reeds to activate the appropriate sound.)

Higher pitched sounds have higher frequencies and shorter wavelengths; lower pitched sounds have lower frequencies and longer wavelengths. Generally speaking, the range of normal human hearing is from twenty Hertz (i.e., sound waves per second) to twenty thousand Hertz. (As they age, people generally loose the ability to hear sounds at the high end of the range of frequencies.) Sound waves with a frequency above twenty thousand Hertz cannot be heard by most humans, and are called ultrasonic. Sound waves with a frequency below twenty Hertz cannot be heard by most humans either, and are called infrasonic. (Infrasonic sound waves may be felt by humans, even if they cannot be heard.) Lower frequency sound waves require more energy to produce than higher frequency sound waves, and thus may require a larger canister and horn (or larger power source and sound producing device).

Optionally, a carrying device such as a strap may be placed over the user's head and around his or her neck to hold the horn and canister, or a belt attachment (made of leather, metal, plastic or other suitable material) can be used to attach the invention to a belt, backpack, bicycle, etc. The canister should be held and stored in an upright position, but should be able to function in any position.

The present invention can be used to prevent interaction between people and dangerous animals. A blast from the invention can clear an area that humans are about to enter, giving them safe passage.

Thousands of people in Africa are killed each year by animals. Most people in developing countries cannot afford guns and ammunition, but the present invention is affordable and cost effective.

Elephants are killed by the hundreds each year in Africa, by farmers whose crops they have raided. The present invention gives the farmers an affordable and humane way of stopping the elephants without killing them.

The present invention may also be used to assist rescuers in finding lost persons. If a person is lost in the mountains and sounds the invention (at a low humanly audible frequency), it may be heard for miles. (A whistling device or a shout has a limited range.) At night the strobe light may be seen for miles, from either the ground or the air.

The present invention may be used in water, as well as air, or in any suitable fluid (gas or liquid). Sound waves (humanly audible, ultrasonic or infrasonic) emitted by the invention may be effective in any suitable fluid. The gas that powers the sound frequencies may be impregnated by odors that also aid in deterring and/or repelling animals.

An optional manual sighting device may be placed on the object. A laser may be used on the invention as a pointing device. Optionally, darts containing hypodermic syringes (with tranquilizer or poison) may be loaded and fired from the invention, perhaps using compressed air as a propellant. The propellant for the dart may be attached to an external power source. Optionally, paint balls could be shot from the invention. The paint balls may be loaded with material that ignites on contact, or have odors or colors that repel animals. An optional digital readout may tell the readiness of the invention, battery power remaining, gas power remaining, etc. Cylinders containing compressed air for the darts or gases with noxious odors may be loaded into the invention.

It is to be understood that the present invention is not limited to the embodiments described above, but encompasses any and all embodiments within the scope of the following claims.

I claim:

1. An animal repellant horn, comprising: a horn that can emit ultrasonic sound eaves; a base that is suitably dimensioned and configured to fit over a canister of compressed gas and to enable the gas to flow from the canister through the horn to cause the horn to emit the ultrasonic sound waves; and a strobe light of sufficient intensity to temporarily blind an animal, said strobe light being adjacent to the horn and supported by an arm extending from the base; said base housing a rotatable manually operated actuator, having at least one setting at which gas flows through the horn to produce sound waves having a frequency of greater than twenty thousand Hertz, and a setting at which the flow of gas through the horn is blocked.

2. The animal repellant horn according to claim 1, further comprising:
    a manually operated actuator, that when depressed enables gas to flow through the horn, and when released prevents the flow of gas through the horn.

3. The animal repellant horn according to claim 2, wherein:
    the manually operated actuator is a push button; and
    a battery pack that supplies electric current that powers the strobe light, and can cause the horn to emit the ultrasonic sound waves without the use of gas from the canister.

4. The animal repellant horn according to claim 1, wherein the strobe light is on the same level as the horn.

5. The animal repellant horn according to claim 1, wherein an eye shield protector may be lowered to cover the strobe light, or raised to allow the strobe light to be used while still protecting a person standing behind the strobe light.

6. The animal repellant horn according to claim 1, wherein the strobe light is turned on and off with a manually operated actuator.

7. The animal repellant horn according to claim 1, wherein the canister of compressed gas is cylindrical, and the rotatable manually operated actuator has an axis of rotation that is the same as the cylindrical axis of the canister.

8. An animal repellant horn, comprising: a horn that can emit infrasonic sound waves; a base that is suitably dimensioned d configured to it over a canister of compressed gas and to enable the gas to flow from the canister through the horn to cause the horn to emit the infrasonic sound waves; and a strobe light of sufficient intensity to temporarily blind an animal, said strobe light being adjacent to the horn and supported by an arm extending from the base; said base housing a rotatable manually operated actuator, having at least one setting at which gas flows through the horn to produce sound waves having a frequency of less than twenty thousand Hertz, and a setting at which the flow of gas through the horn is blocked.

9. The animal repellant horn according to claim 8, further comprising:
    a manually operated actuator, that when depressed enables gas to flow through the horn, and when released prevents the flow of gas through the horn.

10. The animal repellant horn according to claim 9, wherein the manually operated actuator is a push button; and
    a battery pack that supplies electric current that powers the strobe light, and can cause the horn to emit the infrasonic sound waves without the use of gas from the canister.

11. The animal repellant horn according to claim 8, wherein the strobe light is on the same level as the horn.

12. The animal repellant horn according to claim 8, wherein an eye shield protector may be lowered to cover the strobe light, or raised to allow the strobe light to be used while still protecting a person standing behind the strobe light.

13. The animal repellant horn according to claim 8, wherein the strobe light is turned on and off with a manually operated actuator.

14. The animal repellant horn according to claim 8, wherein the canister of compressed gas is cylindrical, and the rotatable manually operated actuator has an axis of rotation that is the same as the cylindrical axis of the canister.

15. A method of using a horn, comprising the steps of: attaching a horn to a canister of compressed gas, said horn having a base that is suitably dimensioned and configured to fit over the canister of compressed gas and to enable the gas to flow from the canister through the horn to cause the horn to emit sound waves; said base housing a manually operated actuator, moving said manually operated actuator to cause the horn to emit sound waves, said manually operated actuator having at least one setting at which the sound waves emitted will be outside the range of normal human hearing; and temporarily blinding an animal by turning on a strobe light of sufficient intensity; said strobe light being adjacent to the horn and supported by an arm extending from the base.

16. The method of using a horn according to claim 15, wherein:
    the manually operated actuator is moved more than once to cause sound waves of different frequencies to be emitted.

17. The method of using a horn according to claim 15, wherein the strobe light is on the same level as the horn; an eye shield protector may be lowered to cover the strobe light, or raised to allow the strobe light to be used while still protecting a person standing behind the strobe light; wherein the strobe light is turned on and off with a manually operated actuator.

18. The method of using a horn according to claim 15, wherein the canister of compressed gas is cylindrical, and the rotatable manually operated actuator has an axis of rotation that is the same as the cylindrical axis of the canister.

* * * * *